(12) United States Patent
Larkin et al.

(10) Patent No.: US 7,834,713 B2
(45) Date of Patent: Nov. 16, 2010

(54) SYNTHESIZED LOCAL OSCILLATOR AND METHOD OF OPERATION THEREOF

(75) Inventors: Stephen D. Larkin, Merrimack, NH (US); Jeffrey H. Blake, Milford, NH (US); Joseph F. Xavier, Chelmsford, MA (US); David E. Majchrzak, Merrimack, NH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/039,873

(22) Filed: Feb. 29, 2008

(65) Prior Publication Data

US 2010/0079173 A1    Apr. 1, 2010

(51) Int. Cl.
*H03B 21/00* (2006.01)
(52) U.S. Cl. ............... 331/179; 327/106; 455/260
(58) Field of Classification Search ........... 331/179; 327/105, 106; 455/76, 165.1, 183.1, 255, 455/260
See application file for complete search history.

(56) References Cited

U.S. PATENT DOCUMENTS

| | | | |
|---|---|---|---|
| 5,028,887 | A | 7/1991 | Gilmore |
| 5,343,168 | A | 8/1994 | Guthrie |
| 5,598,440 | A | 1/1997 | Domagala |
| 5,886,752 | A | 3/1999 | Cross |
| 6,522,176 | B1 | 2/2003 | Davis |
| 7,302,237 | B2 * | 11/2007 | Jackson et al. ............ 455/76 |
| 2008/0252384 | A1 * | 10/2008 | Chow et al. ............ 331/22 |

FOREIGN PATENT DOCUMENTS

| | | |
|---|---|---|
| JP | 1994164388 | 6/1994 |
| JP | 6314929 A | 11/1994 |
| JP | 1994314929 | 11/1994 |
| JP | 1996204554 | 8/1996 |
| JP | 10-126158 A | 5/1998 |
| JP | 1998126158 | 5/1998 |
| WO | 2005062736 | 7/2005 |

OTHER PUBLICATIONS

International Search Report, PCT/US2009/035659, Sep. 30, 2009.
PCT International Preliminary Report on Patentability and Written Opinion of the International Search Authority for International Application No. PCT/US2009/035659, Sep. 10, 2010, 6 pages.

* cited by examiner

*Primary Examiner*—Robert Pascal
*Assistant Examiner*—Levi Gannon
(74) *Attorney, Agent, or Firm*—Cantor Colburn LLP

(57) ABSTRACT

A method for controlling a synthesized local oscillator (SLO) includes: receiving a control input specifying a desired SLO output; receiving reference clock signal; generating a predefined set of dynamic clock signals from the reference clock signal; selecting a dynamic clock signal from the predefined set of dynamic clock signals in response to the control input; using the dynamic clock signal as an input to a direct digital synthesizer (DDS) module to generate a DDS output signal; selecting a DDS output band in response to the control input, the DDS output band including one of a baseband and an alias band; and processing the DDS output band to generate the SLO output.

13 Claims, 2 Drawing Sheets

SYNTHESIZED LOCAL OSCILLATOR AND METHOD OF OPERATION THEREOF

BACKGROUND OF THE INVENTION

Embodiments relate generally to generation of waveforms, and in particular to a synthesized local oscillator and a method of operation thereof.

Broadband synthesizers based on direct digital synthesis (DDS) technology have traditionally led the industry in frequency agility and switching performance, but they have also led in high recurring costs. These high costs stem from the complex nature of DDS-based synthesizers and have resulted in digital synthesizers being utilized primarily in military applications where performance considerations have taken precedence over cost.

Manufacturers of DDS-based synthesizers have long recognized the need to reduce the cost of their products, while still maintaining their lead in performance. Over the years, this has led to the introduction of various modular architectures to reduce complexity. Though these architectures were undoubtedly an improvement, they still did not eliminate the fundamental cost disadvantage of DDS-based synthesizers relative to their analog counterparts.

An existing Direct Digital Synthesizer (DDS) is depicted in FIG. 1. As shown in FIG. 1, the DDS includes a phase accumulator 10 that receives an input corresponding to a change in phase, $\Delta\theta$. The phase accumulator 10 maintains a running total of the phase. The current phase is output to a phase-to-amplitude converter 12 that generates an amplitude value based on the current phase. The phase-to-amplitude converter 12 generates a representation of a sine wave amplitude based on the phase. This may be performed using a look-up table or other known techniques. Lastly, a digital-to-analog converter (DAC) 14 converts that digital amplitude values to an analog signal to generate a sine wave.

The DDS of FIG. 1 suffers from a high level of noise in the output signal, often referred to as spurious signals or spurs. These spurs may be caused by numerical truncation errors and DAC errors. The spurious signal spectrum can change dramatically with slight changes in the input making filtering difficult.

Different approaches have been implemented to address the spurious signals generated by the basic DDS of FIG. 1. Existing DDS devices incorporate frequency, phase or amplitude dither in an attempt to destroy the coherent nature of the DDS spurious sources. These existing dither techniques produce a high level of output noise, are targeted at reducing circuit complexity rather than improving spurious signals, or are of limited effectiveness in reducing DAC generated spurious signals.

Another approach involves incorporating dither mechanisms to randomize DAC error mechanisms, thus improving output linearity and/or increasing effective resolution. Existing DDS's utilizing dither mechanisms without reducing in-band noise generated directly by the introduced dither signal.

Yet another approach involves filtering the output of the DDS using additional RF hardware to reduce spurious signals. Essentially, a DDS is followed by additional RF circuitry (e.g., dividers, filters) to "clean up" the output spectrum of the DDS. These techniques require a substantial amount of additional RF hardware, and/or limit the modulation capabilities of the DDS.

An existing DDS that addresses drawbacks in conventional DDSs is disclosed in U.S. Pat. No. 6,522,176, the entire contents of which are incorporated herein by reference. While well suited for its intended purposes, it is understood that improvements may be made in controlling the output of the DDS in U.S. Pat. No. 6,522,176 to increase output bandwidth.

BRIEF SUMMARY OF THE INVENTION

The shortcomings of the prior art are overcome and additional advantages are provided by a synthesized local oscillator and a method of operation thereof.

An embodiment of the invention a method for controlling a synthesized local oscillator (SLO) output, the method comprising: receiving a control input specifying a desired SLO output; receiving reference clock signal; generating a predefined set of dynamic clock signals from the reference clock signal; selecting a dynamic clock signal from the predefined set of dynamic clock signals in response to the control input; using the dynamic clock signal as an input to a direct digital synthesizer (DDS) module to generate a DDS output signal; selecting a DDS output band in response to the control input, the DDS output band including one of a baseband and an alias band; and processing the DDS output band to generate the SLO output.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Embodiments of the invention include synthesized local oscillator (SLO) based on DDS technology. In operation a user specifies a desired SLO output. A DDS output is generated and processed in order to generate and SLO output signal corresponding to the desired SLO output.

Figure 1:
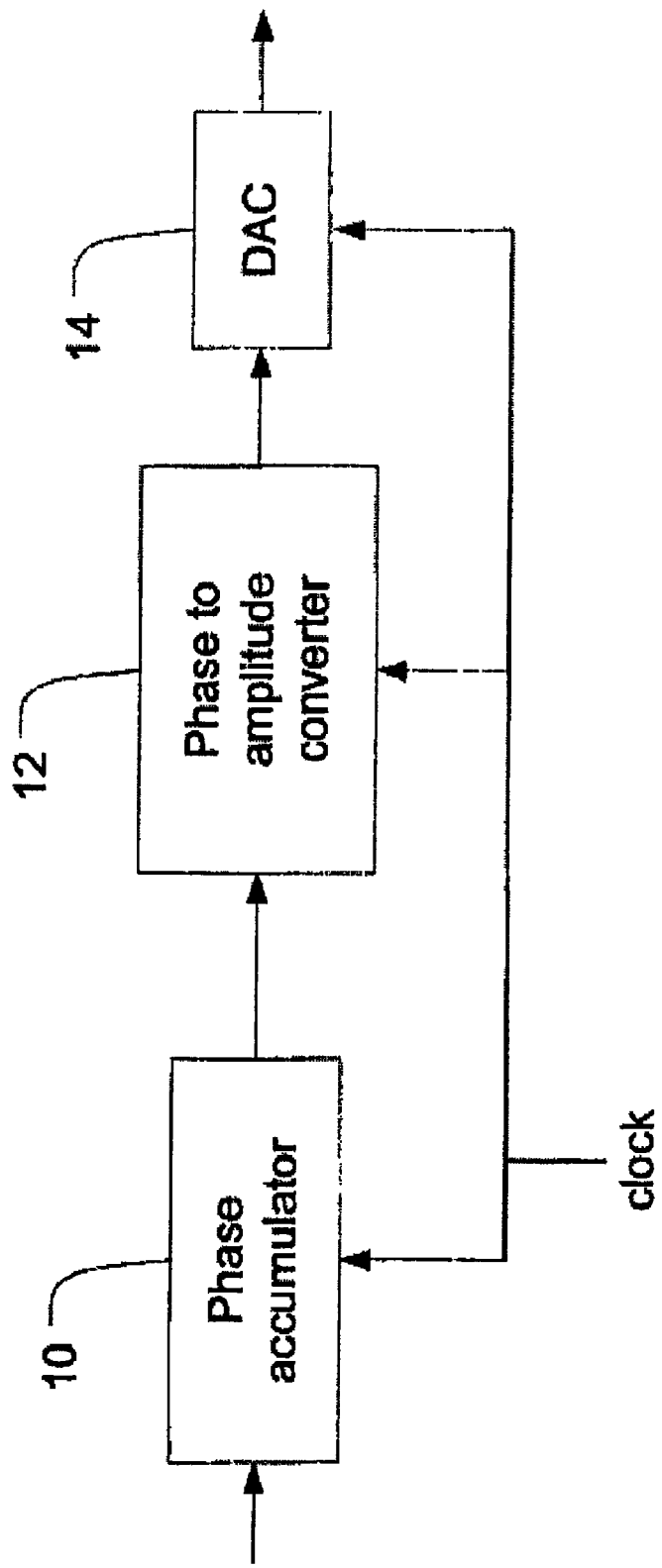
FIG. 1 is a block diagram of a conventional DDS.
Figure 2:
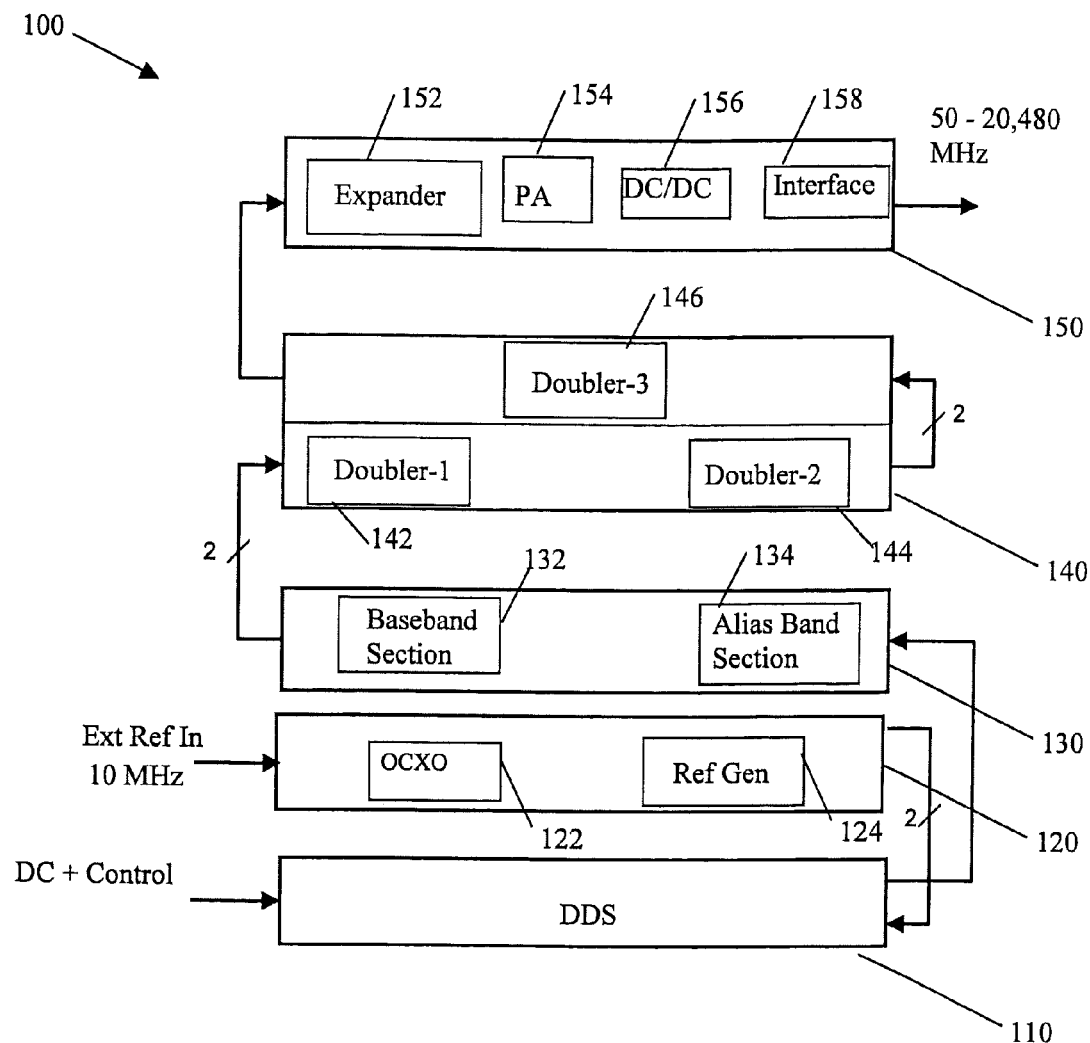
FIG. 2 is a block diagram of a synthesized local oscillator (SLO) in exemplary embodiments.

FIG. 2 is a block diagram of a synthesized local oscillator (SLO) 100 in exemplary embodiments. The SLO 100 includes a number of modules. A DDS module 110 generates a DDS output waveform that is processed by subsequent modules to generate the SLO output. In exemplary embodiments, the DDS module 110 is of the type disclosed in U.S. Pat. No. 6,522,176. DDS module 110, though, can be implemented either through memory-based, or computationally-based techniques.

The DDS module 110 receives as an input a control signal indicating the desired output of the SLO 100. The DDS module 110 also receives a predefined set of dynamic clock signals from the reference module 120. As described in further detail herein, the reference module 120 generates a number of predefined clock signals and the DDS module 110 uses the correct clock signal dependent upon the desired SLO output. Selection of the appropriate dynamic clock signal is performed via a controller resident within the DDS module 110. This controller may also be implemented using either memory-based or computational techniques.

The reference module 120 generates predefined set of clock signals for the DDS module 110. The reference module 120 includes a 50 MHz oven controlled crystal oscillator (OCXO) 122 that generates a constant 50 MHz signal. A reference generator 124 receives the 50 MHz signal and generates the selectable 1750 MHz, 1875 MHz, 2000 MHz, 2125 MHz, and 2250 MHz sampling clocks used by the DDS module 110. The DDS module 110 clocks at 1750, 1875, 2000, 2125, and 2250 MHz dependent upon the desired output.

The reference generator 124 also generates a constant 2000 MHz DDS clock. The reference module 120 accepts an external 10 MHz reference frequency for accurate tuning. The DDS module 110 generates an output frequency of 50 to 640 MHz (fundamental) with $\leq 1$ KHz resolution. As described in further detail below, the baseband and the first and second alias bands may be used to generate the final SLO output.

The output from the DDS module 110 is provided to band selector module 130. The band selector module 130 selects one of a baseband, a first alias band or a second alias band of the DDS output. In exemplary embodiments, the baseband is 50-640 MHz. The first alias band is one of 1280-1450 MHz (for the DDS clocking at 2250 MHz), 1450-1650 (for the DDS clocking at 1875 or 2000 MHz), 1650-1850 MHz (for the DDS clocking at 2125 and 2250 MHz) and 1850-2000 MHz (for the DDS clocking at 2250 MHz). The second alias band is one of 2000-2150 MHz (for the DDS clocking at 1750 MHz), 2150-2300 MHz (for the DDS clocking at 1875 MHz), 2300-2425 MHz (for the DDS clocking at 2000 MHz) and 2425-2560 MHz (for the DDS clocking at 2125 MHz). The band selector module 130 includes a baseband section 132 and an alias band section 134. The baseband section 132 provides the baseband output from the DDS module 110. The alias band section 134 uses a number of filters to select the first or second alias band. The band selector module 130 then selects the baseband, first alias band or second alias band depending on the desired output of the SLO.

The output of the band selector module 130 is provided to one or more processing modules. A first processing module is doubler module 140. The doubler module 140 includes a first doubler 142, second doubler 144 and third doubler 146. First doubler 142 doubles the 50-640 MHz baseband from DDS module 110 to generate an output in a 50-1280 MHZ band. The second doubler 144 doubles the 1280-2560 MHz alias bands from DDS to generate an output in a 1280-5120 MHz band. Both the first doubler 142 and the second doubler 144 include a bypass mode for non-doubling operation. Further, only one of the first doubler 142 and the second doubler 144 is active at a time to prevent unnecessary signals from being generated.

A third doubler 146 sums in the 50-1280 MHz output band of the first doubler 142 to generate an output in a 50-2560 MHz band. The third doubler also doubles the 1280-5120 MHz output of the second doubler 144 to generate an output in a 2560-10,240 MHz band. Again, the third doubler 146 includes a bypass mode for non-doubling operation. The output of the third doubler is in a band of 50-10,240 MHz.

The output of the doubler module is provided to another processing module in the form of an output module 150. The output module includes an expander 152 that expands the selected band from the doubler module 140 to desired output frequency of the SLO as input from a user. The expander 152 also includes a bypass for non-doubling operation. Thus, the expander 152 doubles the frequency band of the doubler module from 50-10,240 MHz to 50-20,480 MHz and provides the final output of the SLO 100. Other system components may be included in the output module 150. A power amplifier 154 is used for output amplification and power leveling across frequencies. A power supply unit 156 includes DC/DC power converter to generate power for various components of the SLO 100 (e.g., +13, +9, and −6 VDC). An interface 158 provides a port for a cable connection to provide communications with the expander 152.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A method for controlling a synthesized local oscillator (SLO) output, the method comprising:
    receiving a control input specifying a desired SLO output;
    obtaining a reference clock signal;
    generating a predefined set of dynamic clock signals from the reference clock signal;
    selecting a dynamic clock signal from the predefined set of dynamic clock signals in response to the control input;
    using the dynamic clock signal as an input to a direct digital synthesizer (DDS) module to generate a DDS output signal;
    selecting a DDS output band, the DDS output band including one of a baseband and an alias band; and
    processing the DDS output band to generate the SLO output;
    wherein processing the DDS output band includes doubling one of the baseband and the alias band to generate either a doubled baseband or doubled alias band.

2. The method of claim 1 wherein:
    processing the DDS output band includes summing the doubled baseband to produce a summed doubled baseband.

3. The method of claim 2 wherein:
    processing the DDS output band includes expanding the summed doubled baseband.

4. The method of claim 1 wherein:
    processing the DDS output band includes doubling the doubled alias band to produce a twice doubled alias band.

5. The method of claim 4 wherein:
    processing the DDS output band includes expanding the twice doubled alias band.

6. The method of claim 1 wherein:
    the predefined set of dynamic clock signals includes 1750 MHz, 1875 MHz, 2000 MHz, 2125 MHz, and 2250 MHz.

7. A synthesized local oscillator comprising:
    a reference module generating a predefined set of dynamic clock signals from a reference clock signal;
    a DDS module receiving a control input specifying a desired SLO output;
    the DDS module selecting a dynamic clock signal from the predefined set of dynamic clock signals in response to the control input to generate a DDS output signal;
    a band selector module selecting a DDS output band, the DDS output band including one of a baseband and an alias band; and
    processing modules to process the DDS output band to generate the SLO output;
    wherein the processing modules include a doubler module, the doubler module including:

a first doubler doubling the baseband of the DDS output band to produce a double baseband;
a second doubler doubling the alias band of the DDS output band to produce a double alias band;
a third doubler summing the doubled baseband to produce a summed doubled baseband;
the third doubler doubling the doubled alias band to produce a twice doubled alias band.

8. The synthesized local oscillator of claim 7 wherein:
the processing modules include an expander expanding the summed doubled baseband.

9. The synthesized local oscillator of claim 7 wherein:
the processing modules include an expander expanding the twice doubled alias band.

10. The synthesized local oscillator of claim 7 wherein:
the predefined set of dynamic clock signals includes 1750 MHz, 1875 MHz, 2000 MHz, 2125 MHz, and 2250 MHz.

11. The synthesized local oscillator of claim 7 wherein:
the first doubler includes a bypass mode to prevent doubling operation.

12. The synthesized local oscillator of claim 7 wherein:
the second doubler includes a bypass mode to prevent doubling operation.

13. A synthesized local oscillator comprising:
a reference module generating a predefined set of dynamic clock signals from a reference clock signal, the predefined set of dynamic clock signals including 1750 MHz, 1875 MHz, 2000 MHz, 2125 MHz, and 2250 MHz;
a DDS module receiving a control input specifying a desired SLO output;
the DDS module selecting a dynamic clock signal from the predefined set of dynamic clock signals in response to the control input to generate a DDS output signal;
a band selector module selecting a DDS output band, the DDS output band including one of a baseband of 50-640 MHz, a first alias band of 1280-2000 MHz, and second alias band of 2000-2560 MHz;
a first doubler doubling the baseband of the DDS output band to produce a double baseband of 50-1280 MHz;
a second doubler doubling the alias band of the DDS output band to produce a double alias band of 1280-5120 MHz;
a third doubler summing the doubled baseband to produce a summed doubled baseband of 50-2560 MHz;
the third doubler doubling the doubled alias band to produce a twice doubled alias band of 2560-10,240 MHz; and
an expander expanding the summed doubled baseband to an output band of 50-5120 MHz;
the expander expanding the twice doubled alias band to an output band of 5120 MHz-20,480 MHz.

* * * * *